(No Model.)

F. & E. W. BARRATT.
APPARATUS FOR PUBLIC AMUSEMENT.

No. 419,490. Patented Jan. 14, 1890.

Witnesses:
J. A. Rutherford
Robert Garrett

Inventors
Frank Barratt,
Edward W. Barratt,
By James L. Norris (No Model.) 5 Sheets—Sheet 4.
F. & E. W. BARRATT.
APPARATUS FOR PUBLIC AMUSEMENT.

No. 419,490. Patented Jan. 14, 1890.

Witnesses,
J. A. Rutherford
Robert Everett

Inventors
Frank Barratt,
Edward W. Barratt,
By James L. Norris.
Atty.

(No Model.) 5 Sheets—Sheet 5.
F. & E. W. BARRATT.
APPARATUS FOR PUBLIC AMUSEMENT.
No. 419,490. Patented Jan. 14, 1890.
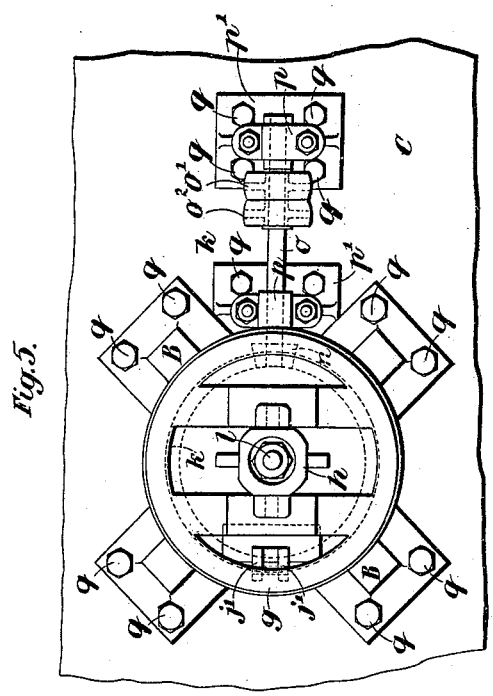
Witnesses.
J. A. Rutherford.
Robert Everett.
Inventors.
Frank Barratt.
Edward W. Barratt.
By James L. Norris.
Atty.
N. PETERS, Photo-Lithographer, Washington, D. C.

United States Patent Office.

FRANK BARRATT AND EDWARD WILLIAM BARRATT, OF LONDON, ENGLAND.

APPARATUS FOR PUBLIC AMUSEMENT.

SPECIFICATION forming part of Letters Patent No. 419,490, dated January 14, 1890.

Application filed November 20, 1888. Serial No. 291,309. (No model.)

*To all whom it may concern:*

Be it known that we, FRANK BARRATT and EDWARD WILLIAM BARRATT, manufacturing confectioners, subjects of the Queen of Great Britain, and both residents of London, England, have invented an Improved Apparatus for Public Recreation, of which the following is a specification, reference being had to the accompanying drawings.

Our invention relates to an improved apparatus for public recreation.

Roundabouts or merry-go-rounds as hitherto usually constructed consist in circular or other suitably-shaped platforms, which are provided with seats or cars or with models or representations of boats or ships, or of horses or other animals, and to which rotary motion is imparted by means of suitable gearing.

In our improved apparatus provision is made for imparting gyratory motion or angular oscillation to the platform—that is to say, the said platform is mounted upon an inclined shaft and supported by a universal joint, and the said shaft is connected with mechanism whereby it may be moved, so that the end thereof, to which the platform is attached, will describe a circle, and the platform will thus be moved in such a manner that each seat or the like thereon will be alternately raised and lowered, moving in an elliptic or approximately-elliptic path, and will at the same time be moved alternately toward and away from the center of the apparatus.

In the accompanying drawings we have shown how our said invention can be conveniently and advantageously carried into practice.

Figure 1:
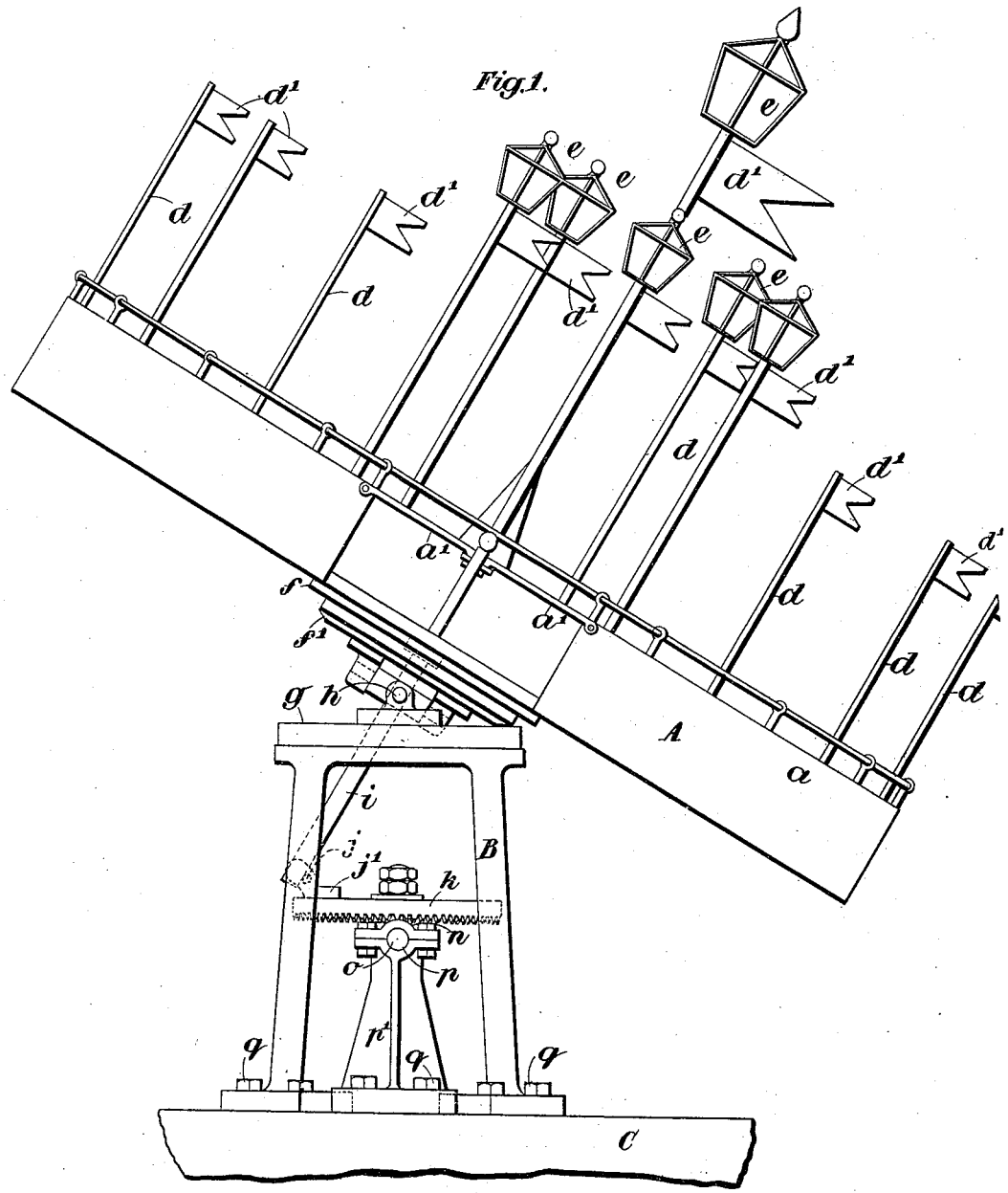
Figure 2:
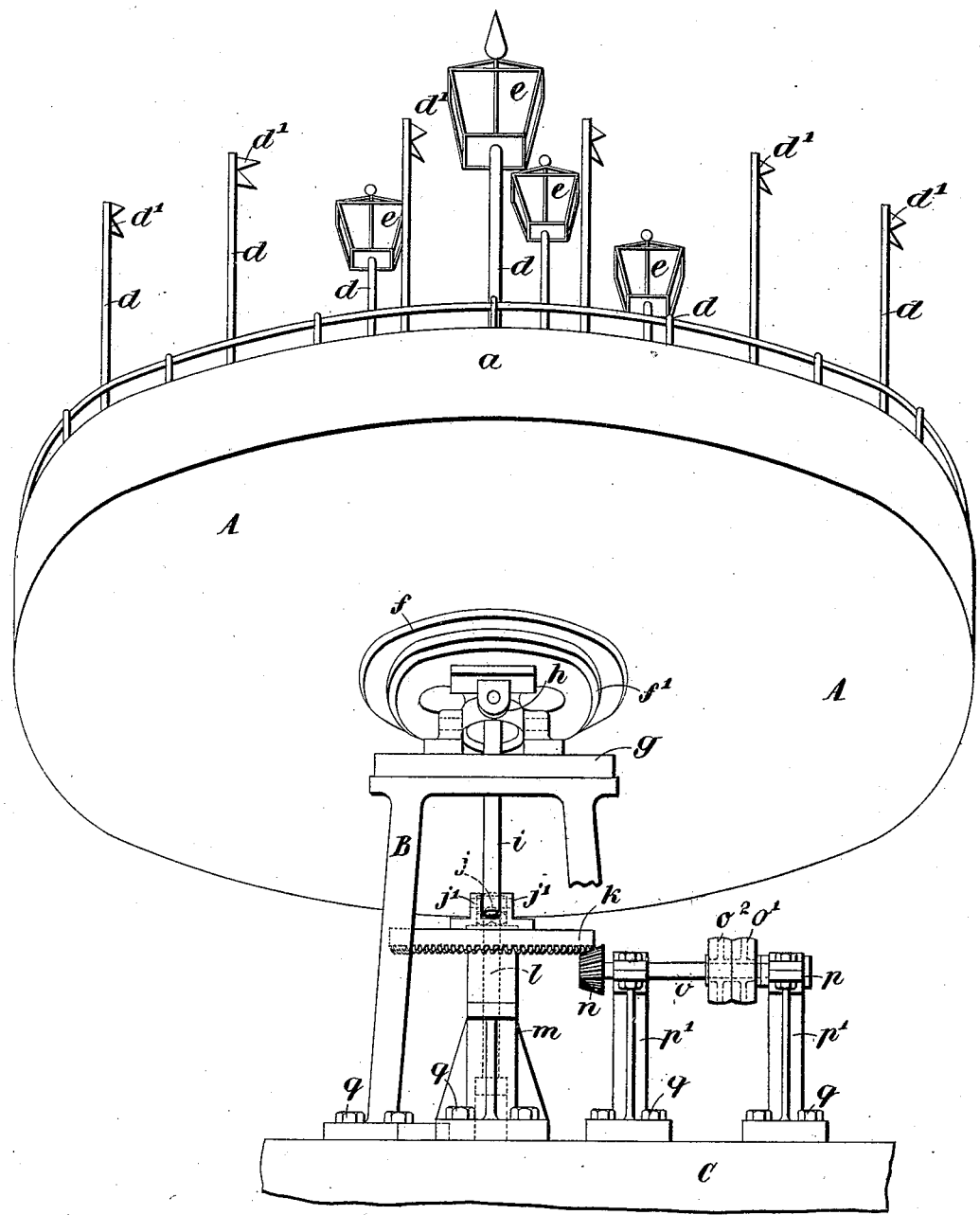
Figure 3:
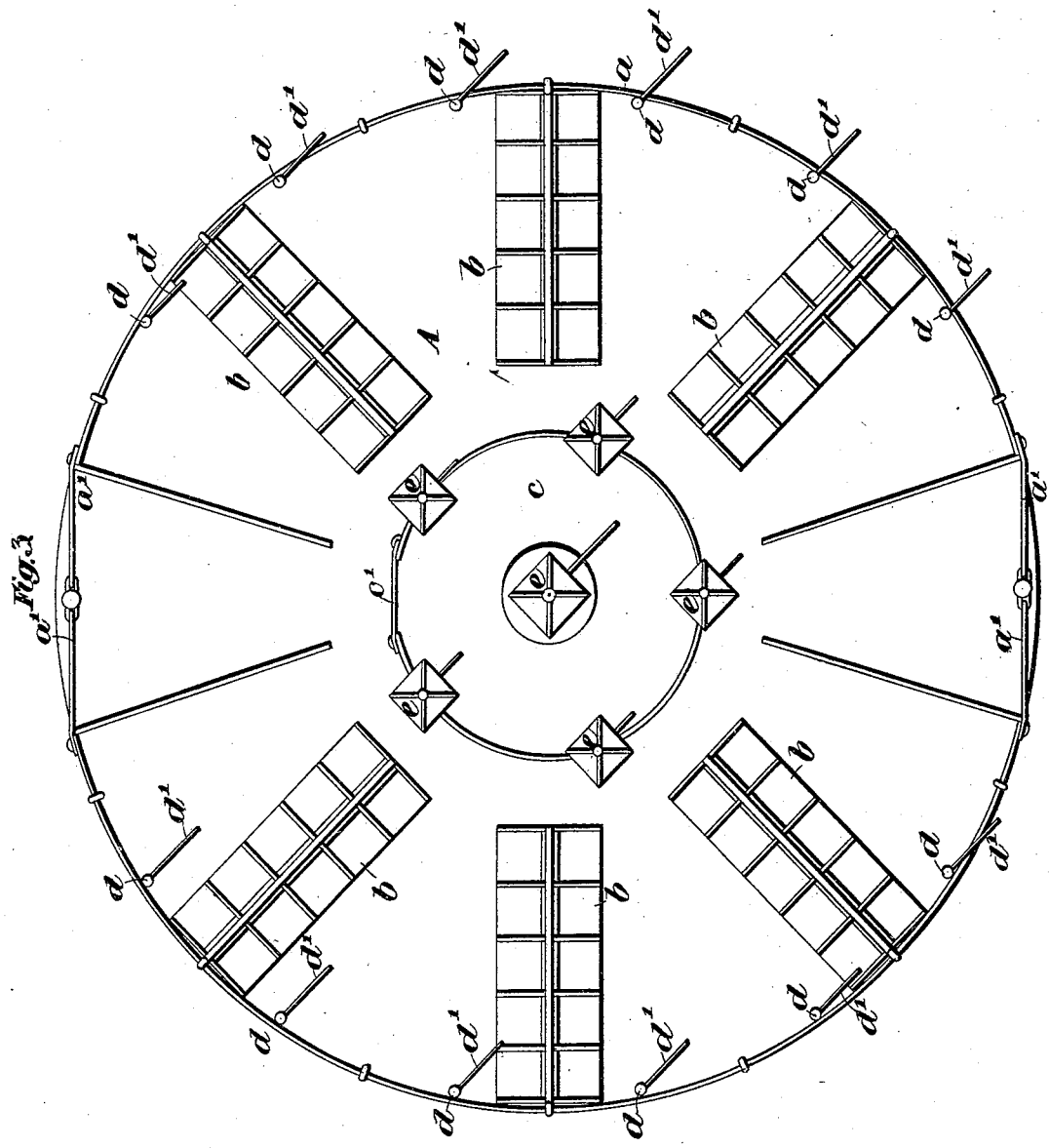
Figure 4:
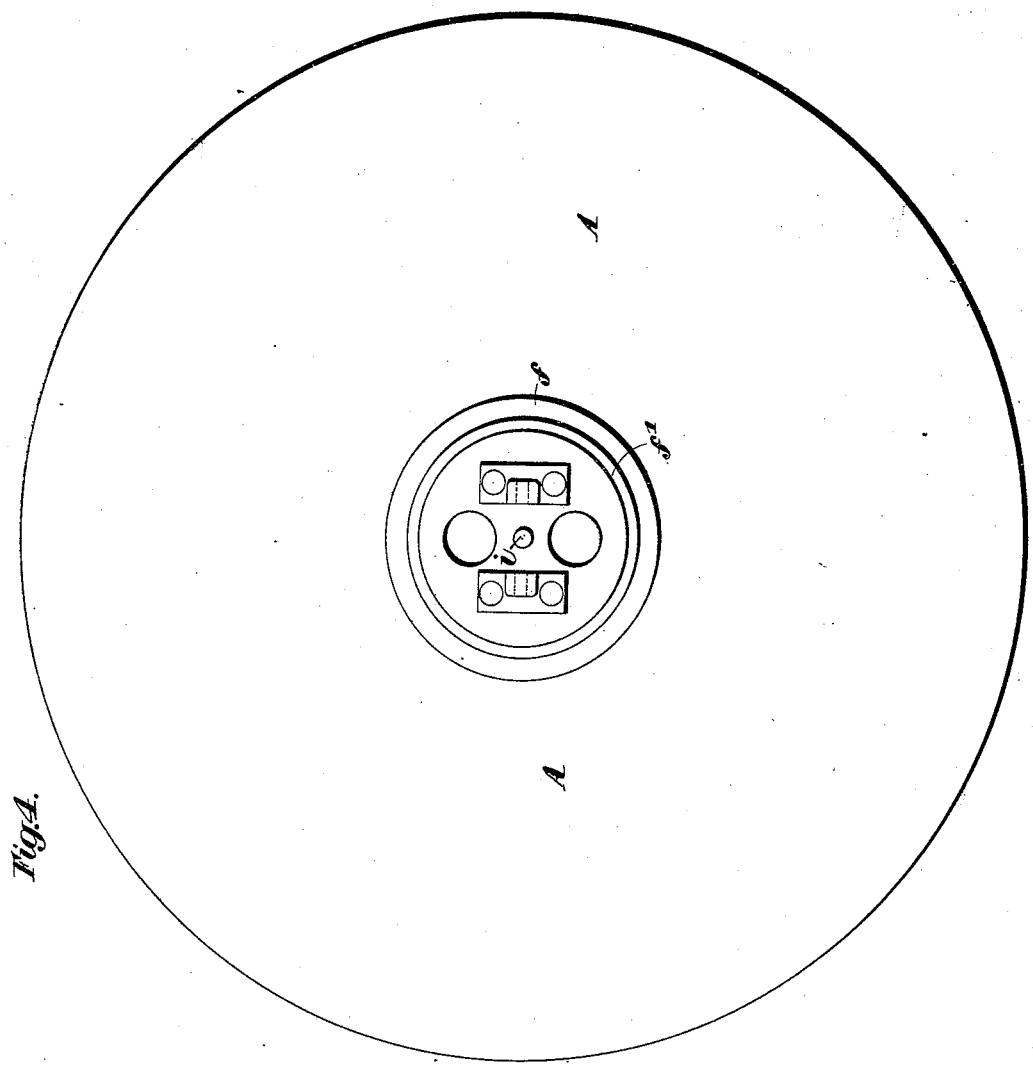

Figure 1 is a side elevation, and Fig. 2 a rear elevation, showing one form of our improved apparatus. Fig. 3 is a plan, and Fig. 4 an under side view, showing the circular platform of the apparatus removed from the gearing. Fig. 5 is a plan of the gearing, the circular platform being removed.

Like letters indicate corresponding parts throughout the drawings.

A is the platform. B is the frame which supports the same and which rests upon a bed-plate or foundation C. The platform A is surrounded with a railing $a$, and is provided with seats $b$ and with a central inclosure $c$, having an entrance-gate $c'$. Gates $a'$ are also provided in the railing $a$ to admit of access to the platform A.

$d\ d$ are flag-staffs, having thereon flags $d'$. Some of the flag-staffs $d$ are provided with lanterns $e$, intended for any suitable description of light.

On the under side of the platform A is provided a circular casting $f$, having a beveled edge $f'$, adapted to turn upon a corresponding path or way $g$, provided upon the upper part of the frame B. The platform A is, moreover, connected to the frame B by means of a universal joint $h$.

$i$ is a shaft firmly fixed to the platform A, perpendicular to the same and adapted to bear or rest against a pin $j$, carried in brackets $j'$, firmly attached to or forming part of a toothed wheel $k$, so as to retain the said platform A at a suitable angle. The toothed wheel $k$ is carried upon a vertical shaft $l$, upon which it is free to rotate. The shaft $l$ is firmly fixed in a suitable standard $m$. The toothed wheel $k$ is rotated by means of a pinion $n$, keyed or otherwise secured upon a shaft $o$, carried in suitable bearings $p$ in standards $p'$, and having thereon the fast pulley $o'$ and loose pulley $o^2$. The frame B and standards $m\ p'$ are secured to the bed-plate or base-plate C by means of bolts $q$ or otherwise. Motive power is applied to the pulley $o'$ by suitable belt-gearing from any convenient source of motive power.

The operation of the apparatus is as follows, that is to say: All or any of the seats $b$ upon the platform A being filled with people, motive power is applied to the pulley $o'$, and rotary motion is imparted through the shaft $o$ and pinion $n$ to the toothed wheel $k$. The lower end of the shaft $i$ is carried around by the said toothed wheel $k$, and the platform A, without rotating upon its axis, turns continuously upon or about the universal joint $h$, the beveled edge $f'$ on the casting $f$ rolling upon the path or way $g$. In this manner a gyratory motion or angular oscillation is imparted to the platform A.

Although we have hereinbefore described a convenient and advantageous method of carrying our said invention into practice, it is obvious that we can somewhat modify the construction of our apparatus without departing from the nature of our said invention.

What we claim is—

1. The combination of the frame B, and the inclined circular platform A, mounted thereon and connected therewith by the universal joint $h$, the said platform having fixed or swinging seats $b$ upon its upper surface, and the beveled plate $f$ on its under side adapted to roll upon the circular path $g$, provided upon the upper part of the said frame B, the central shaft $i$, rigidly connected with the platform and projecting below and loosely journaled at $j'$, eccentrically to the horizontal wheel $k$, and means, substantially such as described, for revolving the said wheel, substantially as set forth.

2. The combination of an inclined circular platform A, mounted upon the frame B and provided with fixed or swinging seats $b$, with a universal joint $h$, shaft $i$, toothed wheel $k$, miter or bevel wheel $n$, shaft or spindle $o$, and fast and loose pulleys $o'$ $o^2$, substantially as described.

3. The combination of a circular platform A, having fixed or swinging seats $b$ thereon, with the plate $f$, having a beveled surface $f'$, adapted to roll upon a circular path $g$, substantially as and for the purpose set forth.

In testimony whereof we have hereunto signed our names in the presence of two subscribing witnesses.

FRANK BARRATT.
    EDWARD WILLIAM BARRATT.

Witnesses:
    S. H. CUSHING,
    WALTER J. SKERTEN.